US008616982B2

(12) United States Patent
Greenberg et al.

(10) Patent No.: US 8,616,982 B2
(45) Date of Patent: Dec. 31, 2013

(54) GAMING TERMINAL WITH IMPROVED LATCHING FOR A CABINET

(75) Inventors: Jacob C. Greenberg, Elgin, IL (US); Bradley D. Cornell, LaGrange, IL (US)

(73) Assignee: WMS Gaming Inc., Waukegan, IL (US)

( * ) Notice: Subject to any disclaimer, the term of this patent is extended or adjusted under 35 U.S.C. 154(b) by 220 days.

(21) Appl. No.: 13/187,225

(22) Filed: Jul. 20, 2011

(65) Prior Publication Data

US 2013/0023346 A1 Jan. 24, 2013

(51) Int. Cl.
*A63F 9/24* (2006.01)
*A63F 13/00* (2006.01)

(52) U.S. Cl.
USPC ............... 463/46; 312/23; 312/107; 312/199; 312/201; 312/222

(58) Field of Classification Search
USPC ............... 312/23, 107, 199, 201, 222; 463/46
See application file for complete search history.

(56) References Cited

U.S. PATENT DOCUMENTS

| | | | | | |
|---|---|---|---|---|---|
| 170,145 | A | * | 11/1875 | Williams | 312/221 |
| 747,309 | A | * | 12/1903 | Whiting | 312/25 |
| 897,467 | A | * | 9/1908 | Kennedy | 312/222 |
| 2,023,356 | A | * | 12/1935 | Fain | 312/201 |
| 2,225,243 | A | * | 12/1940 | Zottel | 312/219 |
| 3,033,634 | A | * | 5/1962 | Ribbens et al. | 312/219 |
| 3,404,929 | A | * | 10/1968 | Wright et al. | 312/216 |
| 4,609,233 | A | * | 9/1986 | Walla | 312/219 |
| 5,588,317 | A | * | 12/1996 | Bianco | 70/265 |
| 6,491,298 | B1 | * | 12/2002 | Criss-Puszkiewicz et al. | 273/148 R |
| 6,820,875 | B1 | | 11/2004 | Hedrick et al. | 273/138.1 |
| 7,264,319 | B2 | * | 9/2007 | Cheng | 312/220 |
| 7,513,830 | B2 | | 4/2009 | Hajder et al. | 463/46 |
| 7,553,237 | B2 | | 6/2009 | Rodriguez et al. | 463/46 |
| 7,758,428 | B2 | * | 7/2010 | Mattice et al. | 463/46 |
| 7,758,429 | B2 | * | 7/2010 | Crivelli et al. | 463/46 |
| 7,806,770 | B2 | | 10/2010 | Taxon | 463/46 |
| 7,833,102 | B2 | * | 11/2010 | Beadell et al. | 463/46 |
| 7,846,026 | B2 | | 12/2010 | Stephenson, III et al. | 463/46 |
| 7,892,098 | B2 | * | 2/2011 | Nguyen et al. | 463/46 |
| 7,946,663 | B2 | * | 5/2011 | Holcomb | 312/218 |
| 8,012,027 | B2 | * | 9/2011 | McGahn et al. | 463/46 |
| 2002/0032051 | A1 | * | 3/2002 | Stockdale | 463/29 |

(Continued)

*Primary Examiner* — Steven J Hylinski
(74) *Attorney, Agent, or Firm* — Nixon Peabody LLP

(57) ABSTRACT

A gaming terminal for conducting a wagering game includes a main body having a cabinet door and a top box positioned above the main body. The cabinet door has a closed position and an open position. The top box includes a crown that is moveable from a first position that prohibits access to the top box to a second position that provides access to the top box. The gaming terminal further includes a latching assembly for securing and releasing the crown. The latching assembly is configured to release the crown in response to the cabinet door being in the open position so as to permit movement of the crown from the first position to the second position. The latching assembly is further configured to secure the crown in response to the crown being moved from the second position to the first position when the cabinet door is in the closed position.

30 Claims, 11 Drawing Sheets

(56) References Cited

U.S. PATENT DOCUMENTS

| | | | | |
|---|---|---|---|---|
| 2004/0192433 | A1* | 9/2004 | Johnson | 463/20 |
| 2005/0064941 | A1 | 3/2005 | Hedrick et al. | 463/46 |
| 2006/0132005 | A1* | 6/2006 | Cheng | 312/219 |
| 2007/0225078 | A1* | 9/2007 | Rodriguez et al. | 463/46 |
| 2008/0113709 | A1* | 5/2008 | Beadell et al. | 463/16 |
| 2008/0113818 | A1* | 5/2008 | Beadell et al. | 463/46 |
| 2008/0119289 | A1* | 5/2008 | Lind et al. | 463/46 |
| 2008/0278043 | A1* | 11/2008 | Holcomb | 312/219 |
| 2010/0016084 | A1 | 1/2010 | Bleich et al. | 463/46 |
| 2010/0248814 | A1* | 9/2010 | Carson et al. | 463/25 |

* cited by examiner

GAMING TERMINAL WITH IMPROVED LATCHING FOR A CABINET

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for performing maintenance on a gaming apparatus, and more particularly, to a gaming terminal having a latching assembly for securing and releasing a crown from a top box of the gaming terminal.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. To perform maintenance and repair activities on gaming terminals, technicians often require access to the interior of gaming terminals to reach internal components.

SUMMARY OF THE INVENTION

According to one aspect of the present invention, a gaming terminal for conducting a wagering game includes a main body having a cabinet door and a top box positioned above the main body. The cabinet door has a closed position and an open position. The top box includes a crown that is moveable from a first position that prohibits access to the top box to a second position that provides access to the top box. The gaming terminal further includes a latching assembly for securing and releasing the crown. The latching assembly is configured to release the crown in response to the cabinet door being in the open position so as to permit movement of the crown from the first position to the second position. The latching assembly is further configured to secure the crown in response to the crown being moved from the second position to the first position when the cabinet door is in the closed position.

According to another aspect of the present invention, a method of performing maintenance on a gaming terminal includes opening a cabinet door coupled to a main body of the gaming terminal. The main body and the cabinet door define a first interior space of the gaming terminal. The cabinet door has a closed position and an open position. The method further includes, in response to opening the cabinet door, removing a crown from a top box of the gaming terminal. The removing the crown from the top box includes releasing the crown from a latching assembly that interacts with the cabinet door. The method also includes closing the cabinet door and, after closing the cabinet door, moving the crown on the top box to secure the crown to the top box via the latching assembly.

According to yet another aspect of the present invention, a gaming terminal includes a main body having a cabinet door and a top box positioned above the main body. The cabinet door has a closed position and an open position. The top box includes a crown that is moveable from a first position that prohibits access to the top box to a second position providing access to the top box. The gaming terminal also includes a latching assembly for securing and releasing the crown. The latching assembly includes a hinge arm coupled to the cabinet door, a driving member extending from the hinge arm, and a latch configured to engage driving member. The latch has a closed latch position for engaging a feature of the crown to secure the crown to the top box and an open latch position for disengaging from the feature of the crown to release the crown from the top box. The hinge arm is actuated in response to the cabinet door being moved between the closed position and the open position, the driving member is actuated in response to the hinge arm being actuated, and the latch is actuated between the closed latch position and the open latch position in response to the driving member being actuated. The latch is actuated in a direction from the closed latch position towards the open latch position in response to the crown being moved from the second position to the first position.

Additional aspects of the invention will be apparent to those of ordinary skill in the art in view of the detailed description of various embodiments, which is made with reference to the drawings, a brief description of which is provided below.

Figure 1:
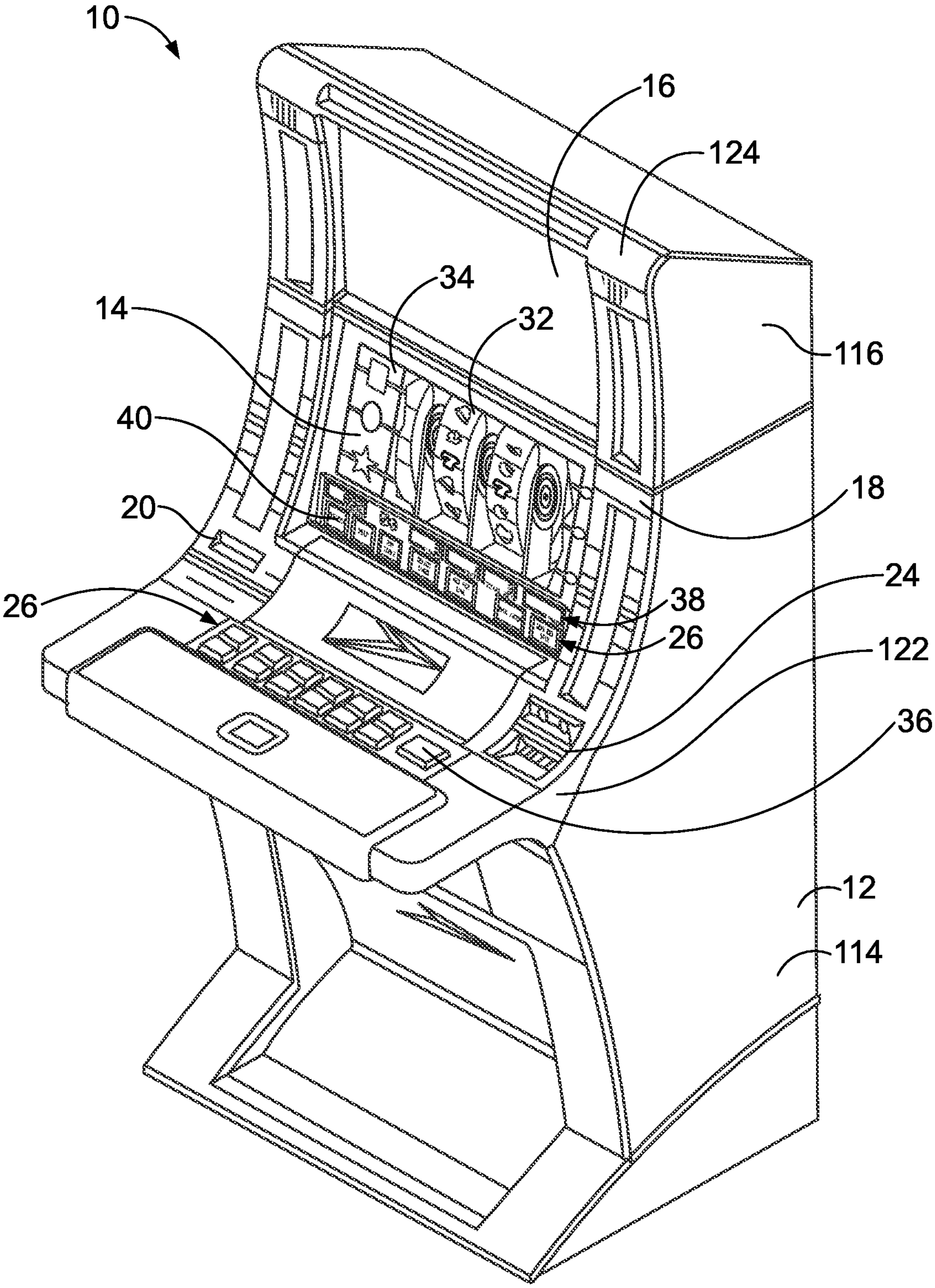
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
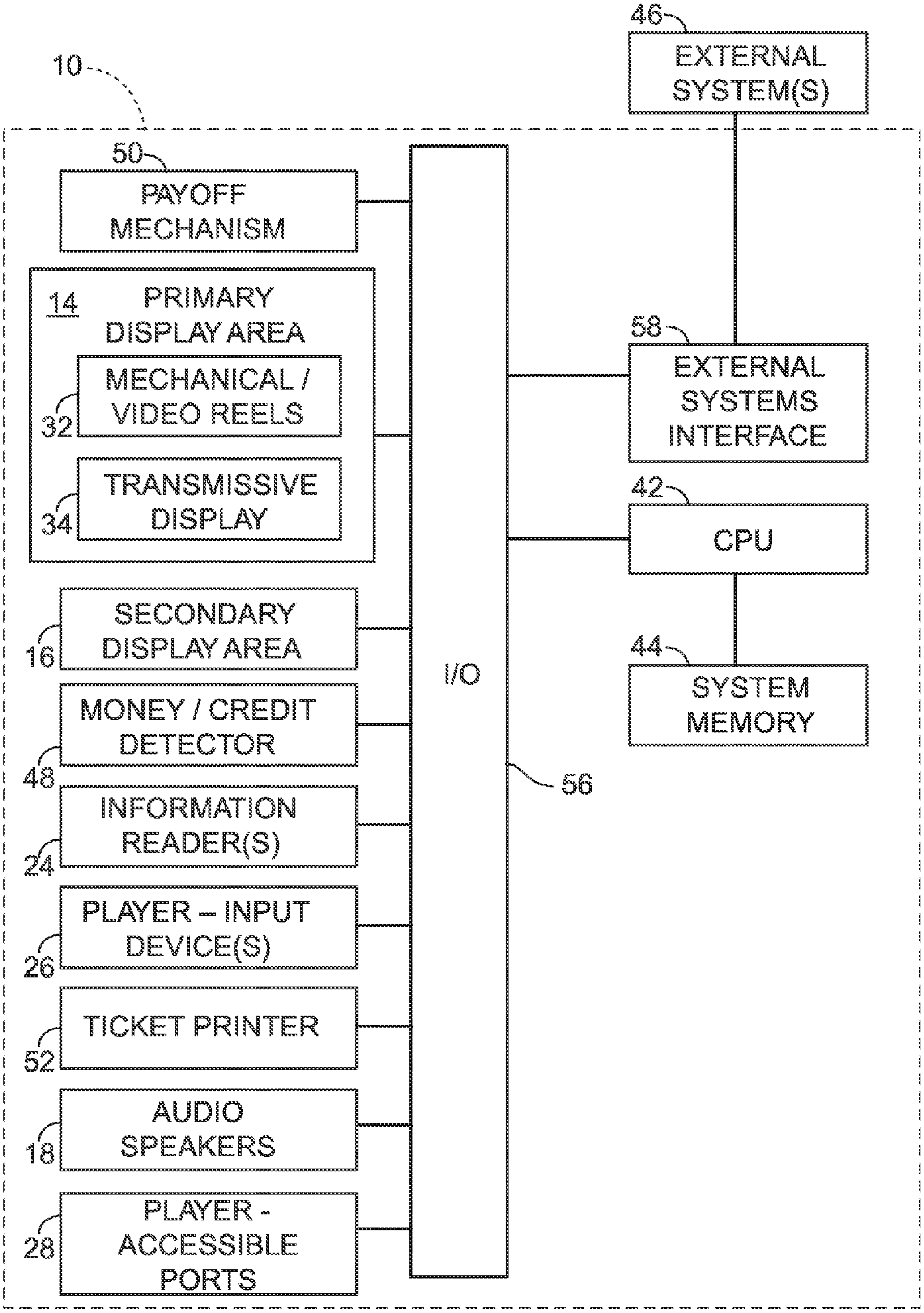
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
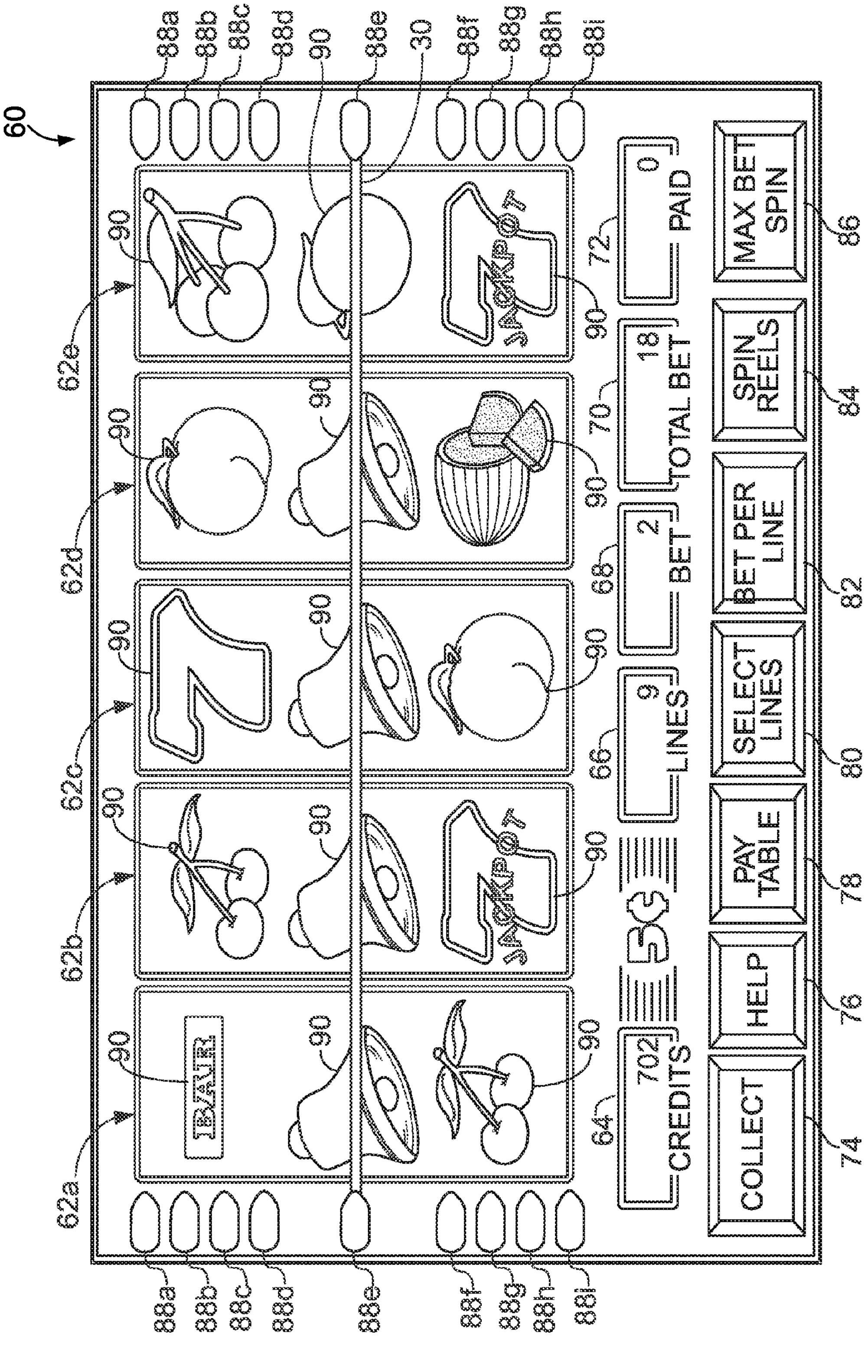
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4A:
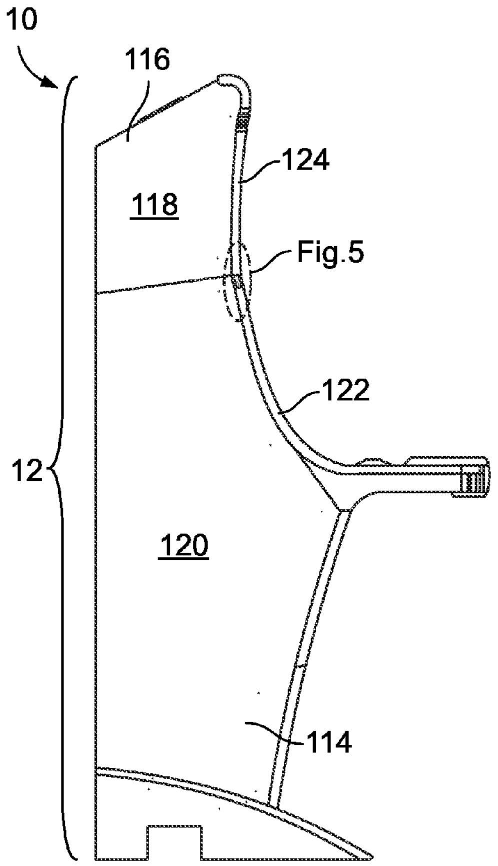
FIG. 4A is a side view of the gaming terminal illustrated in FIG. 1 with a cabinet door in a closed position.

Turning now to FIG. 4A, a side view is shown for the gaming terminal illustrated in FIG. 1. The cabinet 12 of the gaming terminal 10 includes two sections, a main body 114 and a top box 116 positioned above the main body 114. The top box 116 can be integrally formed with the main body 114, or the top box 116 can be separately formed and mounted to the main body 114. The top box 116 can be partitioned from the main body 114 such that an interior space 118 of the top box 116 can be separate from an interior space 120 of the main body 114, or the interior space 118 can be connected to the interior space 120. In general, the main body 114 houses the primary display 14 (see FIG. 1) along with various electronic components of the gaming terminal 10, such as the electronic components described above. The top box 116 generally houses the secondary display 16 (see FIG. 1) and/or various electronic components of the gaming terminal 10 as well.

Figure 4B:
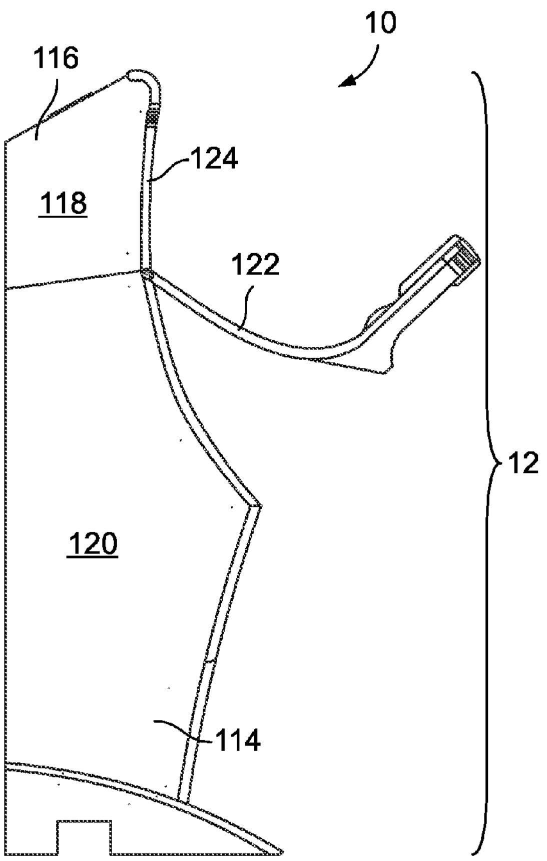
FIG. 4B is a side view of the gaming terminal illustrated in FIG. 1 with a cabinet door in an open position.

The main body 114 includes a cabinet door 122 on the front of the gaming terminal 10, which pivots open in a vertical direction (i.e., about a horizontal axis) to allow access to the interior space 120 of the main body 114 (e.g., for maintenance and repair purposes). FIG. 4A shows a side view of the gaming terminal 10 with the cabinet door 122 in a closed position and FIG. 4B shows a side view of the gaming terminal 10 with the cabinet door 122 in an open position. According to some embodiments, the cabinet door 122 may be supported by at least one shock absorber (not shown), such as, for example, a pneumatic or hydraulic type shock absorber that keeps the cabinet door 122 propped in the open position.

To allow access to the interior space 118 of the top box 116, the top box 116 includes a crown 124 on the front of the top box 116. The crown 124 has a first position that prohibits access to the interior space of the top box 116 (as shown, e.g., in FIGS. 1, 4A, and 4B) and a second position that provides access to the interior space of the top box 116. In the illustrated embodiment of FIG. 1, the crown 124 can be moved in a generally upwards direction relative to the top box 116 to move the crown 124 from the first position to the second position. However, it is contemplated that according to other embodiments of the present invention, the crown can be moved from the first position to the second position in a different manner (e.g., in a generally sideways direction relative to the top box 116).

In the embodiment shown in FIG. 1, the secondary display 16 is mounted within the top box 116 such that the secondary display 16 is viewable through an opening in the crown 124. It is contemplated that according to other embodiments in which no secondary display 16 is provided, there may be no opening in the crown 124.

Figure 5:
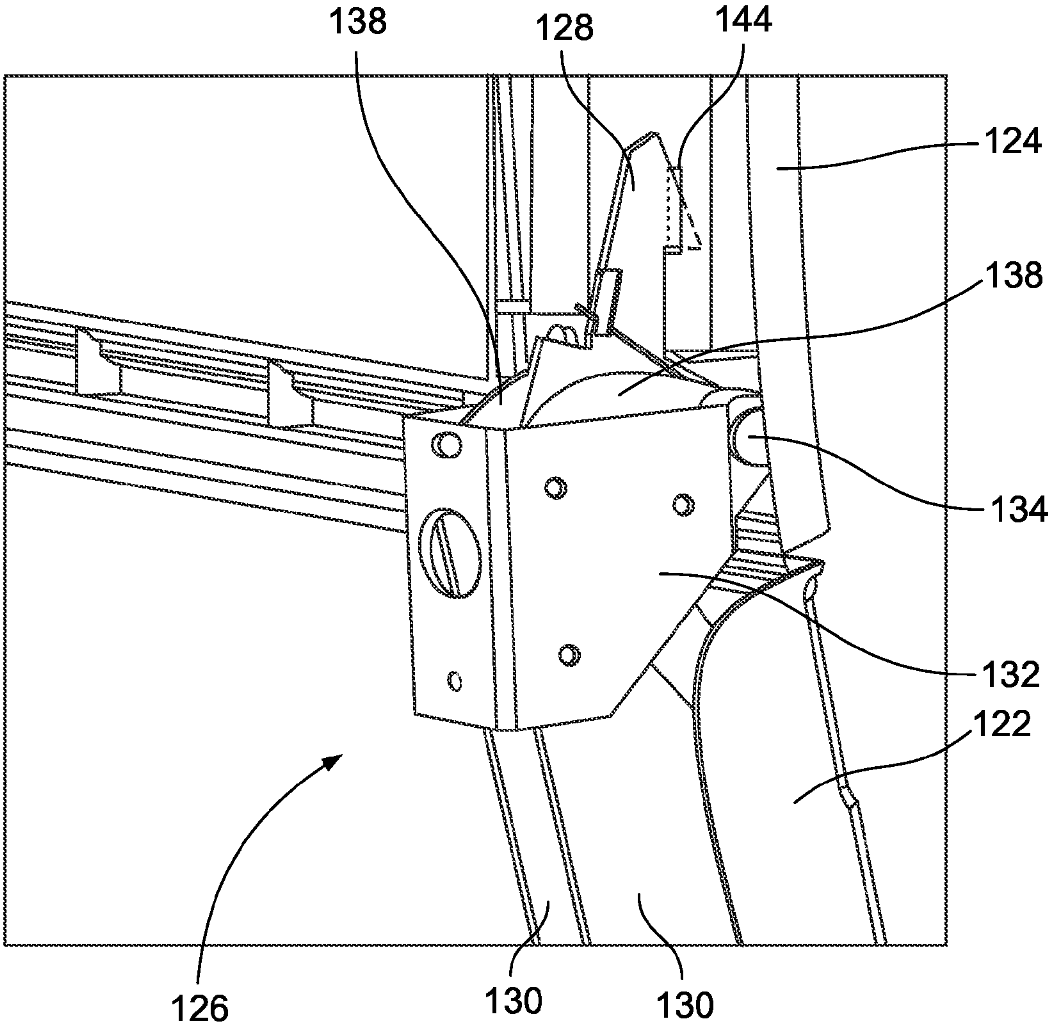
FIG. 5 is a perspective view of a latching assembly according to an embodiment of the present invention.

To secure the crown 124 to and release the crown 124 from the top box 116, the gaming terminal 10 includes a latching assembly 126. FIG. 5 shows an enlarged perspective view of the gaming terminal 10 generally at the location indicated in FIG. 4A with portions of the gaming terminal 10 removed for clarity purposes. The latching assembly 126 includes a latch 128 and a hinge arm 130 that are pivotally coupled to a hinge base 132 of the gaming terminal 10. For example, in the illustrated embodiment of FIG. 5, the latch 128 and the hinge arm 130 are pivotally coupled to the hinge base 132 by a hinge pin 134. The hinge base 132 is fixedly coupled to a frame of the gaming terminal 10. Accordingly, the hinge base 132 remains fixedly positioned within the gaming terminal 10 so as to allow the latch 128 and the hinge arm 130 to move relative to the hinge base 132 and the frame of the gaming terminal 10.

The hinge arm 130 is further coupled to the cabinet door 122 at a door-engagement portion 136 (shown in FIG. 6A) of the hinge arm 130 so that movement of the cabinet door 122 between the closed position and the open position translates to a corresponding movement of the hinge arm 130 about the hinge pin 134. In the illustrated embodiment of FIG. 5, the hinge pin 134 extends though two upper members 138 of the hinge arm 130 provided on opposing sides of the latch 128. Extending between the two upper members 138, the hinge arm 130 includes a driving member 140, which will be described in greater detail below. However, it is contemplated that according to alternative embodiments, the driving member 140 may not extend entirely between the upper members 138 or may extend beyond one or both of the upper members 138.

Figures 6A, 6B:
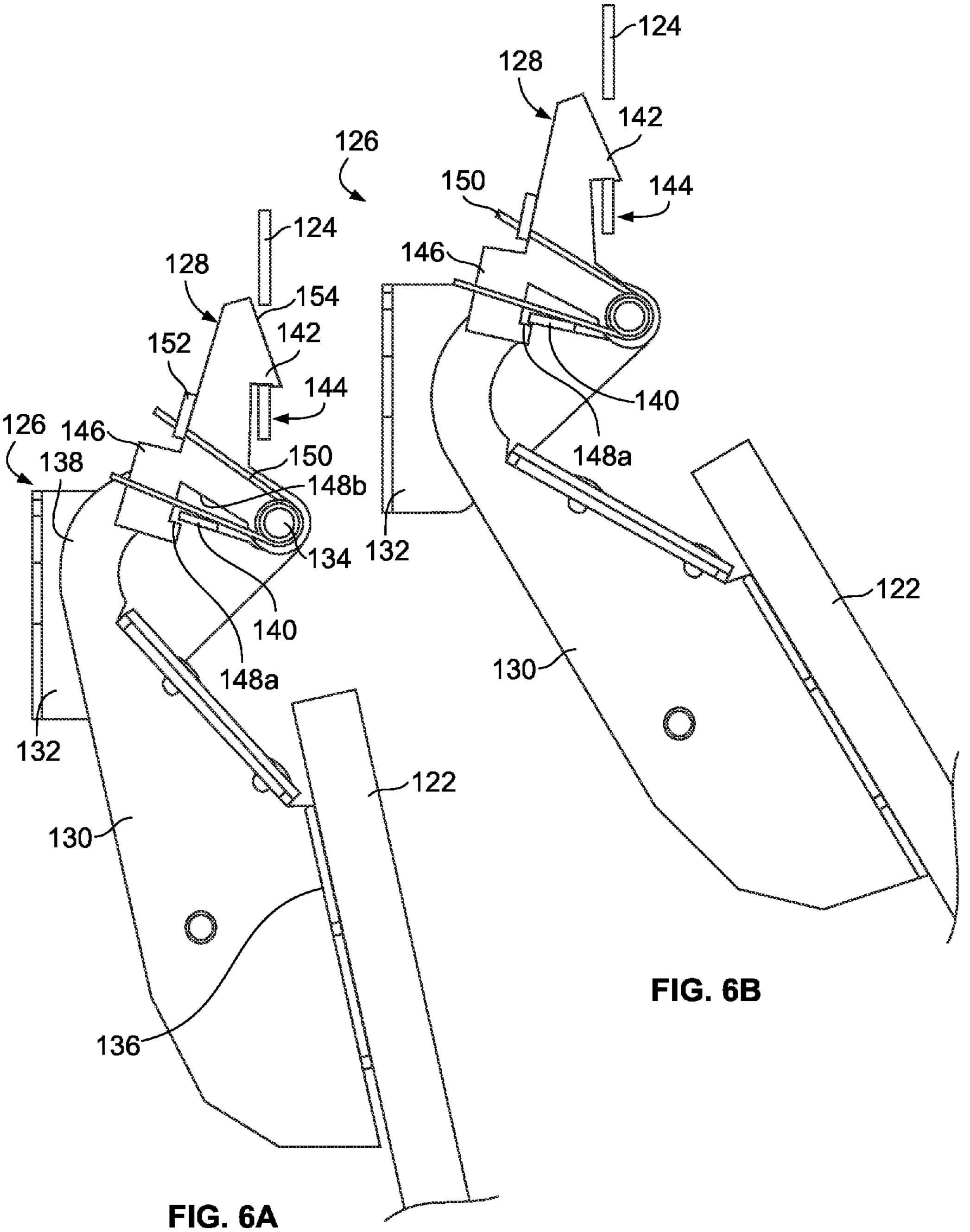
FIG. 6A-D are sectional side views of the latching assembly illustrated in FIG. 5.

To facilitate a further description of the latching assembly 126, a sectional side view of the latching assembly 126, a portion of an inner surface of the crown 124, and a portion of the cabinet door 122 are shown in FIGS. 6A-7C with a portion of the hinge base 132 and one of the upper members 138 of the hinge arm 130 removed for clarity purposes. The latch 128 is configured to engage a feature of the crown 124 so as to secure the crown 124 to the top box 116 when the crown 124 is in the first position. For example, as shown in FIG. 5 and FIG. 6A, the latch 128 can include a first hook 142 that is configured to engage a catch 144 of the crown 124. The catch 144 can be defined by, for example, a cutout portion or an aperture in the inner surface of the crown 124. Accordingly, when the first hook 142 engages the catch 144, the crown 124 is secured to the top box 116 such that removal of the crown 124 from the top box 116 is prevented or substantially inhibited.

The latch 128 is further configured to engage the driving member 140 of the hinge arm 130. In the illustrated embodiment of FIGS. 5-7C, the driving member 140 extends through a space defined by a second hook 146 of the latch 128 and, in particular, a space between a first surface 148*a* of the second hook 146 and a second surface 148*b* of the second hook 146, as will be described in greater detail below.

As described above, the latch 128 is pivotally coupled to the hinge base 132 by the hinge pin 134 to permit movement of the latch 128 relative to the hinge base 132. The latch 128 has a closed latch position for securing the crown 124 to the top box 116 and an open latch position for releasing the crown 124 from the top box 116. The latch 128 is biased in a direction from the open latch position towards the closed latch position (i.e., a clockwise direction with respect to FIG. 6A) by, for example, a spring 150. In the illustrated embodiment, the latch 128 includes a spring-engagement member 152 extending from the first hook 142 of the latch 128. The spring 150 engages the spring-engagement member 152 at a first end of the spring 150 and the driving member 140 of the hinge arm 130 at a second end of the spring 150. However, it is contemplated that according to other embodiments the spring 150 may engage any other portion of the latch 128, the hinge arm 130, and/or the hinge base 132 to bias the latch 128 towards the closed latch position.

FIG. 6A shows the latching assembly 126 with the crown 124 in the first position and the cabinet door 122 in the closed position. With the cabinet door 122 in the closed position, the hinge arm 130 is in a corresponding position, which permits the latch 128 to be biased to the closed latch position by the spring 150. Accordingly, with the crown 124 in the first position and the latch 128 in the closed latch position, the first hook 142 of the latch 128 engages the catch 144 of the crown 124 so as to secure the crown 124 to the top box 116 and prevent or substantially inhibit removal of the crown 124 from the top box 116.

In FIG. 6A, the driving member 140 does not engage the first surface 148*a* of the second hook 146 due to the engagement of the first hook 142 and the catch 144. FIG. 6B shows the latching assembly 126 with the crown 124 in the first position and the cabinet door 122 partially opened an initial distance to an intermediate position. As shown in FIG. 6B, when the cabinet door 122 is moved the initial distance from the closed position towards the open position (i.e., a counterclockwise direction with respect to FIG. 6B), the hinge arm 130 moves relative to the latch 128 such that the driving member 140 translates through a space, defined by the second hook 146 of the latch 128, towards the first surface 148*a* of the second hook 146. In FIG. 6B, the driving member 140 still does not engage the first surface 148*a* of the second hook 146. Accordingly, although the cabinet door 122 is partially opened, the latch 128 remains biased in the closed latch position, securing the crown 124 to the top box 116. In other words, the latch 128 and the driving member 140 can be configured to provide a dwell such that the latch 128 is not actuated through an initial movement of the cabinet door 122 to an intermediate position between the closed position to the open position.

Advantageously, the dwell allows for increased security and relaxed manufacturing tolerances because the cabinet door 122 is required to travel a greater distance prior to actuating the latch 128 to release the crown 124 from the top box 116. However, it is contemplated that according to other embodiments in which no dwell is provided, the driving member 140 can engage the first surface 148*a* of the second hook 146 while the crown 124 is in the first position and the cabinet door 122 is in the closed position.

Figures 6C, 6D:
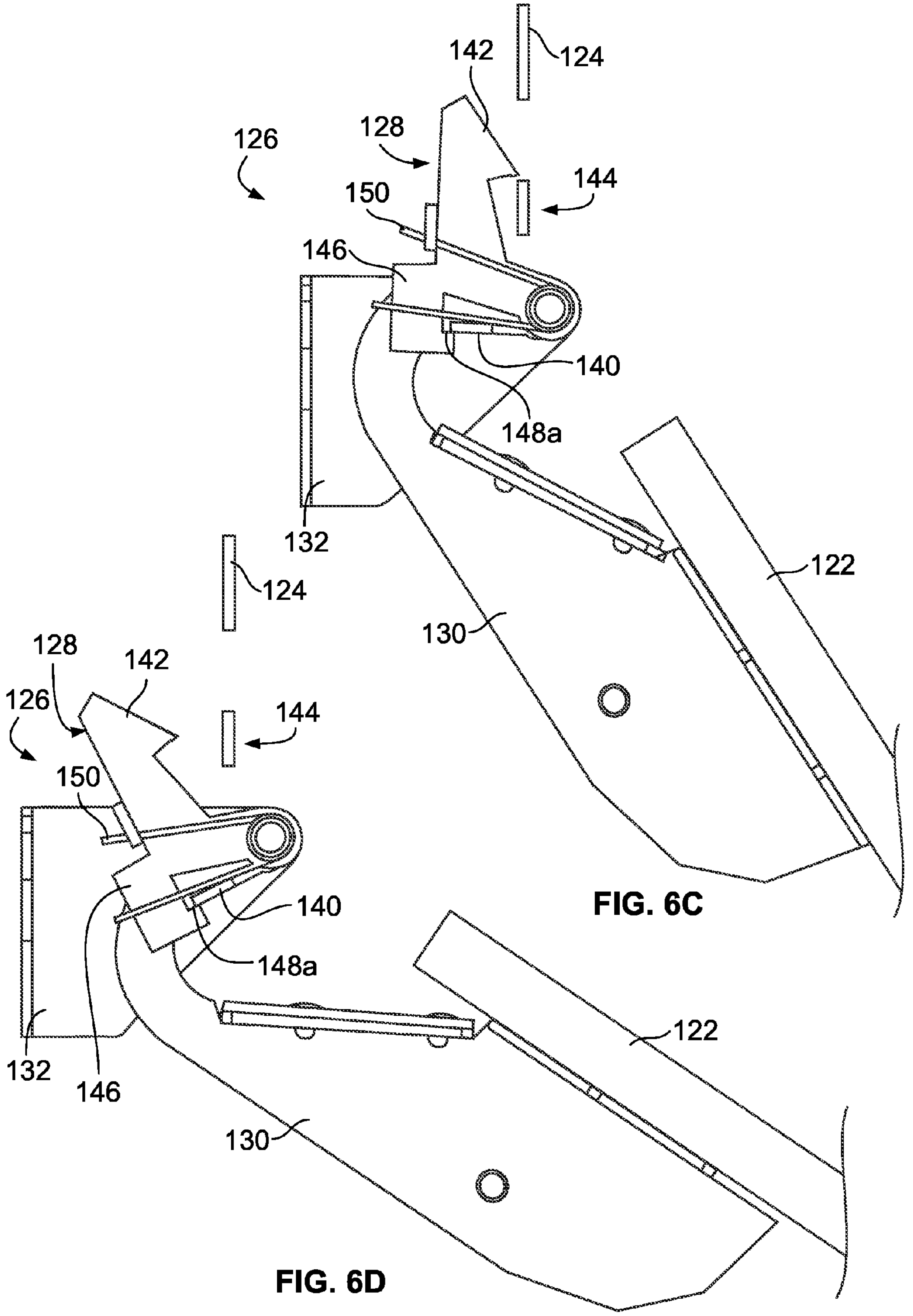

FIG. 6C shows the latching assembly 126 with the crown 124 in the first position and the cabinet door 122 partially opened a further distance. As shown in FIG. 6C, as the cabinet door 122 is further moved from the closed position towards the open position (i.e., a counterclockwise direction with respect to FIG. 6C), the hinge arm 130 corresponding rotates about the hinge pin 134. As the hinge arm 130 rotates, the driving member 140 engages the first surface 148*a* of the second hook 146 of the latch 128 and moves the latch 128 from the closed latch position towards the open latch position. The latch 128 will continue to move towards the open latch position as the cabinet door 122 is moved towards the open position.

FIG. 6D shows the latching assembly 126 with the crown 124 in the first position and the cabinet door 122 in the open position. As shown in FIG. 6D, with the cabinet door 122 in the open position, the latch 128 is in the open latch position due to the engagement between the driving member 140 and the second hook 146 of the latch 128. In the open latch position, the first hook 142 is disengaged from the catch 144 releasing the crown 124 from the top box 116 so as to permit movement of the crown 124 from the first position to the second position.

While the latch 128 is in the open latch position and the cabinet door 122 is in the open position for FIG. 6D, it is to be understood that the latch 128 may be in the open latch position prior to the cabinet door 122 being in the open position.

In other words, the open latch position may include any position of the latch 128 in which the first hook 142 is disengaged from the catch 144, releasing the crown 124 while the crown 124 is in the first position. Accordingly, regardless of whether the latch 128 reaches the open latch position prior to or at the same time as the cabinet door 122 reaches the open position, the crown 124 is released in response to the cabinet door 122 being moved from the closed position to the open position.

Figures 7A, 7B, 7C:
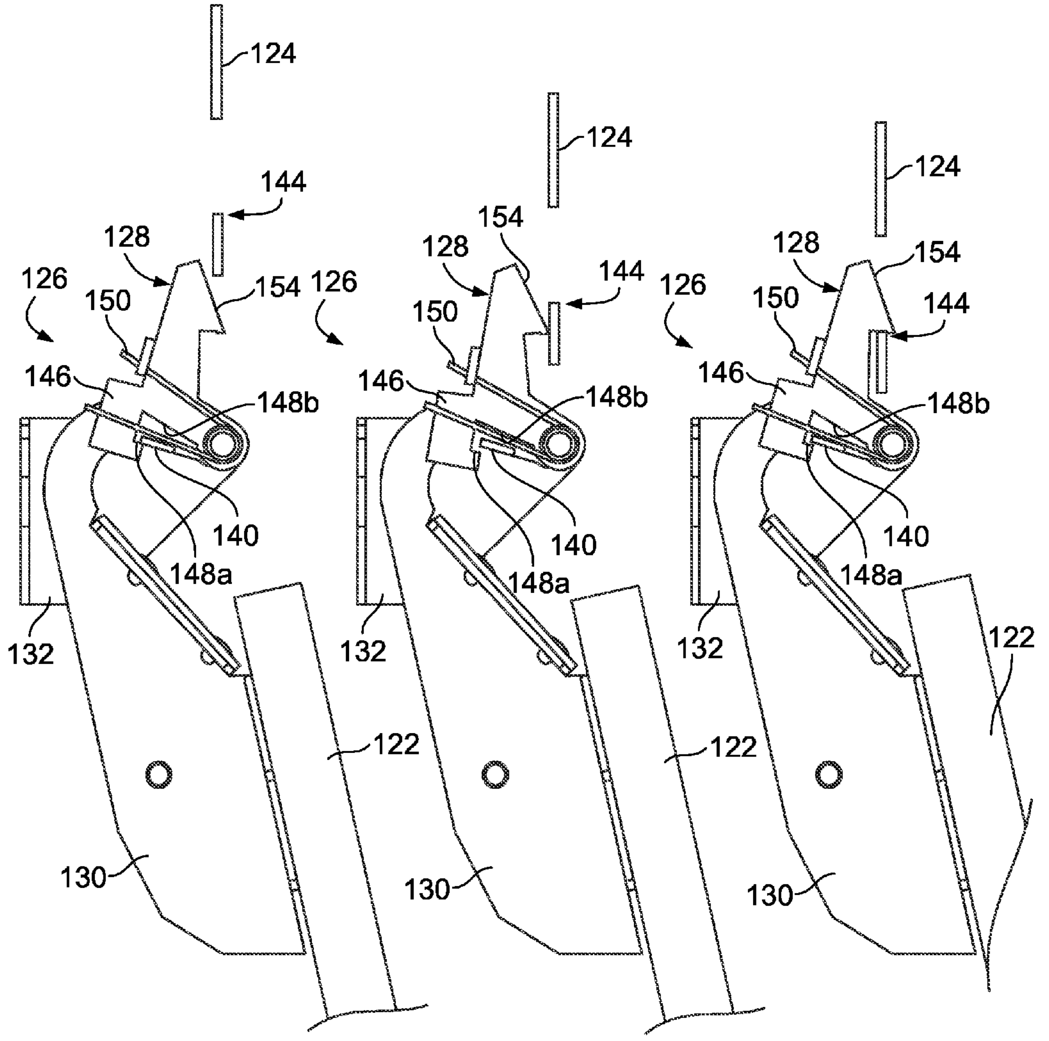
FIG. 7A-C are sectional side views of the latching assembly illustrated in FIG. 5.

Referring now to FIGS. 7A-C, the latching assembly 126 is shown as the crown 124 is moved from the second position to the first position with the cabinet door 122 in the closed position. While the cabinet door 122 is in the closed position, the hinge arm 130 and the driving member 140 generally remain static relative to the hinge base 132 regardless of any movement of the latch 128 and/or the crown 124.

FIG. 7A shows the latching assembly 126 with the cabinet door 122 in the closed position and the crown 124 in the second position. As shown in FIG. 7A, when the cabinet door 122 is in the closed position and the crown 124 is in the second position, no portion of the crown 124 engages the latch 128 to limit the rotation of the latch 128, due to the force of the spring 150, to the closed latch position. However, the latch 128 and/or the driving member 140 can be configured to limit the rotation of the latch 128, due to the force of the spring 150, when the cabinet door 122 is in the closed position and the crown 124 is in the second position. For example, as shown in FIG. 7A, the first surface 148*a* of the second hook 146 engages the driving member 140, which is rotationally fixed when the cabinet door 122 is in the closed position, to provide a first stop that prevents or substantially inhibits the latch 128 from over-rotating excessively past the closed latch position.

FIG. 7B shows the latching assembly 126 with the cabinet door 122 in the closed position and the crown 124 partially moved from the second position towards the first position. As the crown 124 is moved from the second position towards the first position, the crown 124 engages the latch 128 with a sufficient force to overcome the spring-biasing force and move the latch 128 from the closed latch position in a direction towards the open latch position (i.e., a counterclockwise direction with respect to FIG. 7B). To facilitate the movement of the latch 128 toward the open latch position as the crown 124 is moved towards the first position, the latch 128 can include an exterior surface 154 having a sloped profile. However, it is contemplated that the latch 128 can include any other suitable feature for engaging the crown 124 and facilitating the movement of the latch 128 toward the open latch position as the crown 124 is moved from the second position to the first position. Advantageously, as described above, the latch 128 and/or the driving member 140 can be configured to provide a first stop that ensures that the exterior surface 154 of the latch 128 is properly positioned to engage the crown 124 as the crown 124 is moved from the second position to the first position.

With the cabinet door 122 in the closed position, the hinge arm 130 is fixed relative to the hinge base 132 as the crown 124 is moved from the second position to the first position. Accordingly, the latch 128 is configured to move relative to the hinge arm 130 in response to the force applied by the crown 124 as the crown 124 is moved from the second position to the first position with the cabinet door 122 in the closed position. For example, as the latch 128 moves toward the open latch position, the second hook 146 of the latch 128 is configured to move relative to the driving member 140 of the hinge arm 130 such that the driving member 140 translates through a space, defined by the second hook 146, from the first surface 148*a* of the second hook 146 towards the second surface 148*b* of the second hook 146.

If the latch 128 is sufficiently moved in the direction from the closed latch position toward the open latch position, the second surface 148*b* of the second hook 146 may eventually engage the driving member 140, preventing or substantially inhibiting further rotation of the latch 128. Accordingly, the latch 128 and/or the driving member 140 can be configured to permit the latch 128 to sufficiently move toward the open latch position while providing a second stop that prevents or substantially inhibits excessive over-rotation of the latch 128 in the direction from the closed latch position toward the open latch position.

FIG. 7C shows the latching assembly 126 with the cabinet door 122 in the closed position and the crown 124 in the first position. As shown in FIG. 7C, once the crown 124 is moved to the first position, the spring 150 forces the first hook 142 of the latch 128 into engagement with the catch 144 of the crown 124, securing the crown 124 to the top box 116.

While the embodiments illustrated and described for FIGS. 5-7C include a latching assembly 126 having a hinge arm 130 with two upper members 138, it is contemplated that, according to other embodiments, the hinge arm 130 may include any number of upper members 138 (e.g., one, two, three, etc.) for pivotally coupling the hinge arm 130 to the hinge base 132. Additionally, with respect to the embodiments illustrated and described for FIGS. 5-7C, it is contemplated that the hinge base 132 can be integral with or mounted to the frame of the gaming terminal.

Figure 8:
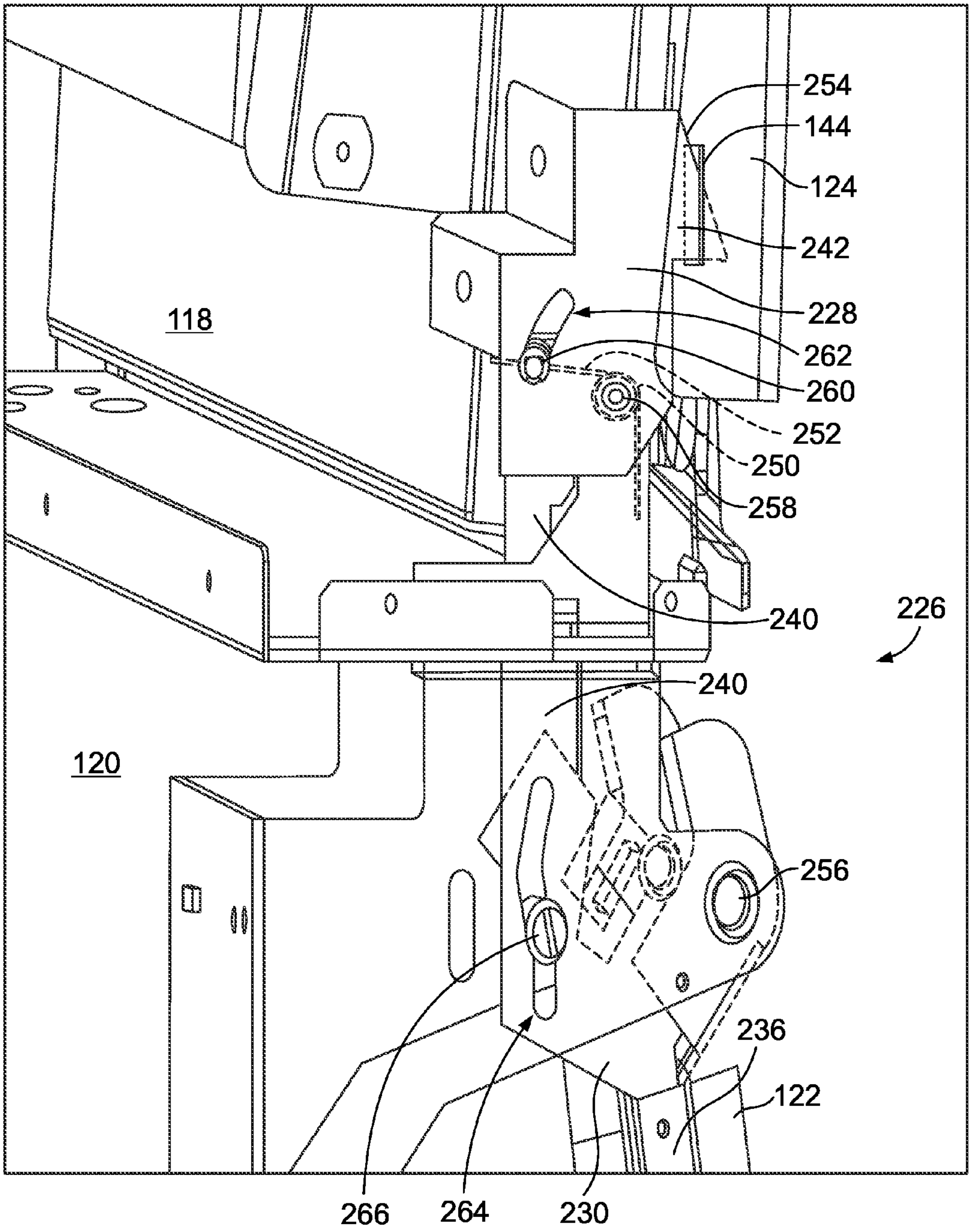
FIG. 8 is a perspective view of a latching assembly according to an alternative embodiment of the present invention.

Turning now to FIG. 8, a latching assembly 226 according to another embodiment of the present invention is shown. The latching assembly 226 includes a hinge arm 230 in the interior space 120 of the main body 114, a driving member 240 extending between the interior space 120 of the main body 114 and the interior space 118 of the top box 116, and a latch 228 in the interior space 118 of the top box 116. It will be appreciated that the latching assembly 226 of FIG. 8 has different space constraint requirements than the latching assembly 126 of FIGS. 5-7C. Accordingly, the latching assembly 226 can be advantageously provided for gaming terminals 10 having particular space constraint limitations that may not be as well suited for the latching assembly 126, and vice versa.

The hinge arm 230 is pivotally coupled to the frame of the gaming terminal 10 at a first pivot point 256. The cabinet door 122 is coupled to the hinge arm 230 at a door-engagement portion 236 of the hinge arm 230 so that movement of the cabinet door 122 between the closed position and the open position translates to a corresponding movement of the hinge arm 230 about the first pivot point 256. The hinge arm 230 is further coupled to a first end of the driving member 240 so that movement of the hinge arm 230 about the first pivot point 256 may translate to a movement of the driving member 240, as will be described in greater detail below.

The driving member 240 is further coupled to the latch 228 at a second end of the driving member 240, as will be described in greater detail below. The latch 228 is pivotally coupled to the frame of the gaming terminal 10 at a second pivot point 258. The latch 228 has a closed latch position for securing the crown 124 to the top box 116 and an open latch position for releasing the crown 124 from the top box 116. Accordingly, the latch 228 is configured to engage a feature of the crown 124 so as to secure the crown 124 to the top box 116 when the latch 228 is in the closed latch position and the crown 124 is in the first position. For example, the latch 228 can include a hook 242 configured to engage a catch 144 of the crown 124 (e.g., a feature defined by a cutout or an aperture in an inner surface of the crown 124). As described above, when the hook 242 engages the catch 144, the crown 124 is secured to the top box 116 such that removal of the crown 124 from the top box 116 is prevented or substantially inhibited.

The latch 228 is biased in a direction from the open latch position towards the closed latch position by, for example, a spring 250. In the illustrated embodiment of FIG. 8, the latch 228 includes a spring-engagement member 252 extending from the hook 242 of the latch 228. The spring 250 engages the spring-engagement member 252 at a first end of the spring 250 and the frame of the gaming terminal at a second end of the spring 250. However, it is contemplated that according to other embodiments the spring 250 may engage any other portion of the latch 228, the driving member 240, and/or the frame of the gaming terminal 10 to bias the latch 228 towards the closed latch position.

The coupling of the driving member 240 and the latch 228 is configured to permit the latch 228 to be moved from the closed latch position to the open latch position in response to the cabinet door 122 being moved from the closed position to the open position and in response to the crown 124 being moved from the second position to the first position with the cabinet door 122 in the closed position. For example, in the illustrated embodiment of FIG. 8, the driving member 240 includes a first pin 260 that is received in a first slot 262 of the latch 228 to couple the driving member 240 to the latch 228.

With the cabinet door 122 in the closed position and the crown 124 in the first position (as shown in FIG. 8), the hook 242 of the latch 228 is spring-biased into engagement with the catch 144 of the crown 124 so as to secure the crown 124 to the top box 116 and prevent or substantially inhibit removal of the crown 124 from the top box 116. When the cabinet door 122 is moved from the closed position to the open position, the hinge arm 230 rotates about the first pivot point 256. The rotation of the hinge arm 230 about the first pivot point 256 actuates the driving member 240 in a generally downwards direction relative to the latch 228. As the driving member 240 moves in the generally downwards direction, the first pin 260 of the driving member 240 engages a lower end of the first slot 262 of the latch 228 with sufficient force to overcome the spring-bias and move the latch 228 about the second pivot point 258 in a direction from the closed latch position to the open latch position (i.e., a counterclockwise direction with respect to FIG. 8). Once the latch 228 reaches the open latch position, the hook 242 is disengaged from the catch 144 releasing the crown 124 from the top box 116 so as to permit movement of the crown 124 from the first position to the second position.

From the second position, the crown 124 can be moved to the first position to secure the crown 124 to the top box 116 while the cabinet door 122 is in the closed position. Initially, with the crown 124 in the second position and the cabinet door 122 in the closed position, the latch 228 is spring-biased towards the closed latch position. To prevent excessive over-rotation of the latch 228 in a direction towards the closed latch position (i.e., in a clockwise direction with respect to FIG. 8), the latch 228 and/or the driving member 240 can be configured to provide a first stop. For example, in the embodiment illustrated in FIG. 8, the first stop can be provided by the lower end of the first slot 262 engaging the first pin 260 of the driving member 240, which generally remains static when the cabinet door 122 is in the closed position.

As the crown 124 is moved from the second position to the first position, the crown 124 engages the latch 228 with sufficient force to overcome the spring-bias and move the latch 228 in a direction from the closed latch position toward the open latch position (i.e., a counterclockwise direction with respect to FIG. 8). To facilitate the movement of the latch 228 toward the open latch position as the crown 124 is moved to the first position, the latch 228 can include an exterior surface 254 having a sloped profile.

The hinge arm 230 and the driving member 240 generally remain static while the cabinet door 122 is in the closed position. Accordingly, the first slot 262 and the first pin 260 are configured to allow the latch 228 to move relative to the driving member 240 in response to the force of the crown 124 applied to the latch 228. In the embodiment of FIG. 8, as the latch 228 moves from the closed latch position to the open latch position, the latch 228 moves with respect to the driving member 240 such that the first pin 260 translates along the first slot 262 towards an upper end of the first slot 262. To facilitate the movement of the latch 228 about the second pivot point 258, the first slot 262 can be configured as a circular arc having a focal point corresponding to the location of the second pivot point 258. If the latch 228 is sufficiently moved in a direction from the closed latch position toward the open latch position, the upper end of the first slot 262 may eventually engage the first pin 260 of the driving member 240, preventing or substantially inhibiting further movement of the latch 228. Accordingly, the latch 228 and/or the driving member 240 can be configured to permit the latch 228 to sufficiently move toward the open latch position while providing a second stop that prevents or substantially inhibits excessive over-rotation of the latch 228 in the direction from the closed latch position toward the open latch position. Once the crown 124 reaches the first position, the spring 250 forces the hook 242 of the latch 228 into engagement with the catch 144 of the crown 124, securing the crown 124 to the top box 116.

As described above, the cabinet door 122 is coupled to the hinge arm 230 so that movement of the cabinet door 122 between the closed position and the open position translates to a corresponding movement of the hinge arm 230 about the first pivot point 256. And, as described above, the hinge arm 230 is coupled to a first end of the driving member 240 so that movement of the hinge arm 230 about the first pivot point 256 may translate to movement of the driving member 240. In the embodiment illustrated in FIG. 8, the hinge arm 230 includes a second slot 264 and the driving member 240 includes a second pin 266 for coupling the hinge arm 230 to the first end of the driving member 240. When the cabinet door 122 is moved from the closed position to the open position (i.e., a counterclockwise direction with respect to FIG. 8), the hinge arm 230 correspondingly rotates about the first pivot point 256. As the hinge arm 230 rotates about the first pivot point 256, the second pin 266 translates along the second slot 264 until the second pin 266 reaches an upper end of the second slot 264. As the second pin 266 translates along the second slot 264 but before the second pin 266 reaches the upper end of the second slot 264, the driving member 240 generally remains static relative to the latch 228. Accordingly, although the cabinet door 122 may be partially opened, the latch 228 remains biased in the closed latch position, securing the crown 124 in the first position to the top box 116. Once the second pin 266 reaches the upper end of the second slot 264, further rotation of the hinge arm 230 actuates the driving arm, which in turn actuates the latch 228, as described above. Accordingly, the hinge arm 230 and the driving member 240 (e.g., the second slot 264 and the second pin 266) can be configured to provide a dwell such that the latch 228 is not actuated through an initial movement of the cabinet door 122 from the closed position to an intermediate position between the closed position to the open position.

It is also contemplated that, according to some embodiments, the hinge arm 230 and the driving member 240 can be configured (e.g., via one or more slot(s) and pin(s)) to provide a dwell such that the latch 228 is not actuated through other movements of the cabinet door such as, for example, movements of the cabinet door from the intermediate position to the closed position and/or movements between two different intermediate positions between the open position and the closed position. In other words, the latching assembly 226 can be configured to provide a dwell such that the latch 288 is not actuated in response to specific movements (e.g., an initial movement, an intermediate movement, and/or a final movement) of the cabinet door 122 between the closed position and the open position. However, according to alternative embodiments, the hinge arm 230 can be coupled to the driving member 240 without providing a dwell so that any movement of the cabinet door 122 and the hinge arm 230 translates to a movement of the driving member 240.

Advantageously, the second slot 264 and the second pin 266 can be configured to permit adjustment of the position of the second pin 266 along the second slot 264 to adjust the dwell provided when the cabinet door 122 is moved from the closed position to the open position. For example, the second pin 266 can be a screw and the dwell can be adjusted by loosening the screw, moving the driving member 240 with respect to the hinge arm 230 so as to adjust the position of the screw along the second slot 264, and tightening the screw in the adjusted position.

In the embodiments described above with respect to FIGS. 5-8, the crown 124 is secured to and released from the top box 116 by one latching assembly 126, 226 coupled to one cabinet door 122; however, it is contemplated that according to alternative embodiments, the crown 124 can be secured to and released from a top box 116 by a plurality of latching assemblies (e.g., latching assembly 126, latching assembly 226, and/or a variation thereof) coupled to one or more cabinet doors. For example, a plurality of latching assemblies can be coupled to the cabinet door 122 such that the cabinet door 122 actuates each of the plurality of latching assemblies. As another example, a gaming terminal can include a plurality of cabinet doors coupled to one or more of a plurality of latching assemblies. To release the crown 124 from the top box 116 and permit movement of the crown 124 from the first position to the second position, each of the plurality of cabinet doors is individually actuated (e.g., by moving the cabinet door from a closed position to an open position).

Figure 9:
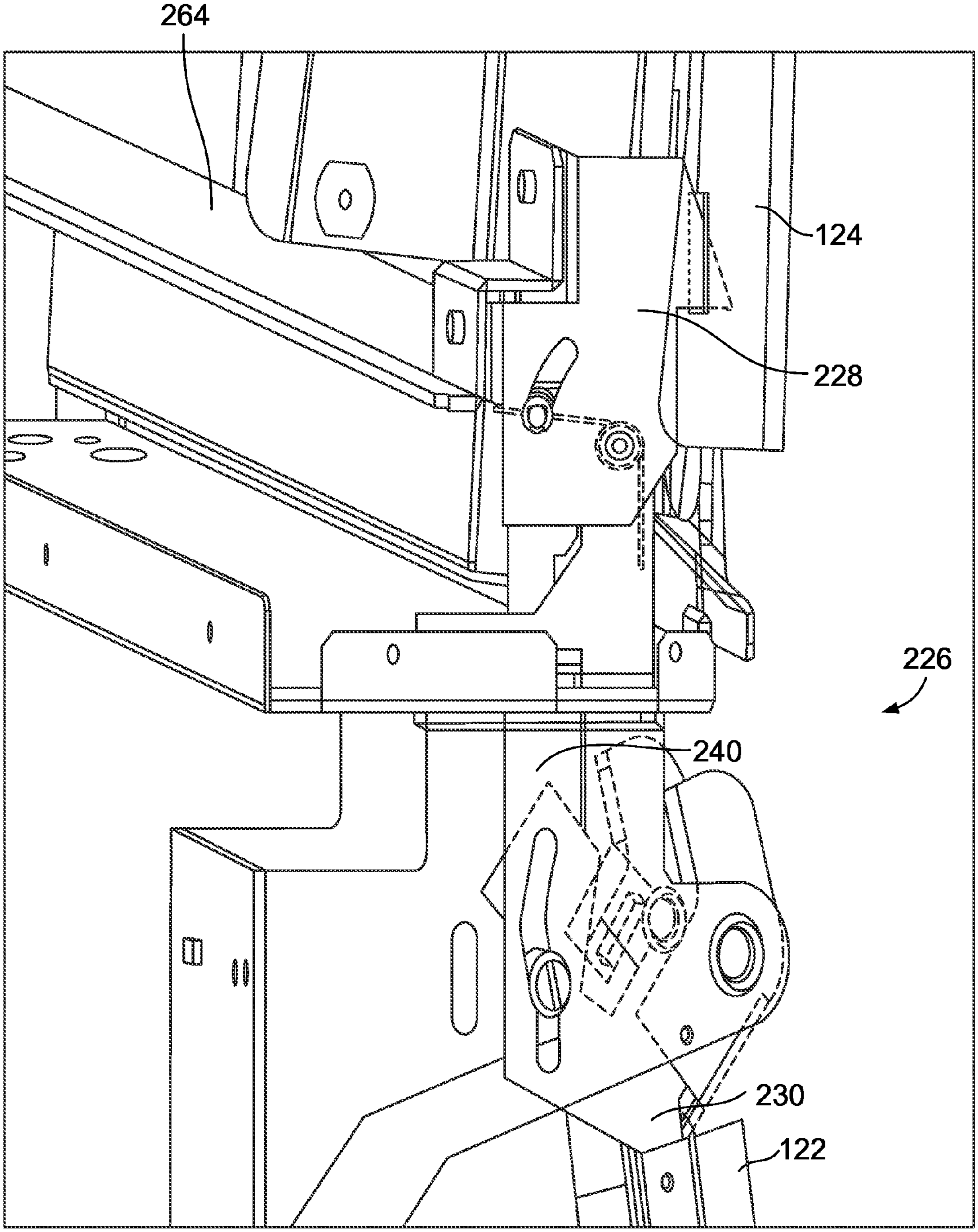
FIG. 9 is an perspective view of the latching assembly illustrated in FIG. 8 and a hook link.

Alternatively, the plurality of latching assemblies can be configured to simultaneously actuate in response to one of the latching assemblies being individually actuated by one of the plurality of cabinet doors. For example, FIG. 9 shows a first latching assembly 226 coupled by a hook link 264 to a second latching assembly (not shown). More specifically, a latch 228 of the first latching assembly 126 is coupled to a first end of the hook link 264 and a latch of the second latching assembly is coupled to a second end of the hook link 264. The latch 228 of the first latching assembly 226 is configured to engage a first catch 244 of the crown 124 and the latch 128 of the second latching assembly is configured to engage a second catch (not shown) of the crown 124.

The first latching assembly 226 includes a hinge arm 230 that is coupled to a first cabinet door 122 and the second latching assembly 126 includes a hinge member that is coupled to a second cabinet door (not shown). When the first cabinet door 122 is actuated from a closed position to an open position, the hinge arm 230 of the first latching assembly 126 rotates, thereby actuating the latch 228 of the first latching assembly 226 as described above with respect to the embodiment illustrated in FIG. 8 and the latch of the second latching assembly via the hook link 264. Similarly, when the second cabinet door is actuated from a closed position to an open position, the hinge arm of the second latching assembly rotates, thereby actuating the latch of the second latching assembly and the latch 228 of the first latching assembly 226 via the hook link 264.

According to alternative embodiments, it is contemplated that the second latching assembly may not be coupled to any cabinet door or the second latching assembly can include a latch pivotally coupled to a fixed member (e.g., the frame of the gaming terminal) so that the second latching assembly is actuated only in response to actuation of the first latching assembly 226 via the hook link 264.

Although the illustrated embodiments of FIGS. 4A-9 have been described with respect to a gaming terminal having one or more cabinet doors that pivot open in a vertical direction (i.e., about a horizontal axis) to allow access to an interior space of a main body, it is contemplated that the cabinet door(s) can alternatively pivot open in a horizontal direction (i.e., about a vertical axis). Additionally, while the embodiments illustrated and described with respect to FIGS. 4A-9 include a single-piece or integral driving member 140, it is contemplated that the driving member 140 can include one or more coupled components.

Figure 10:
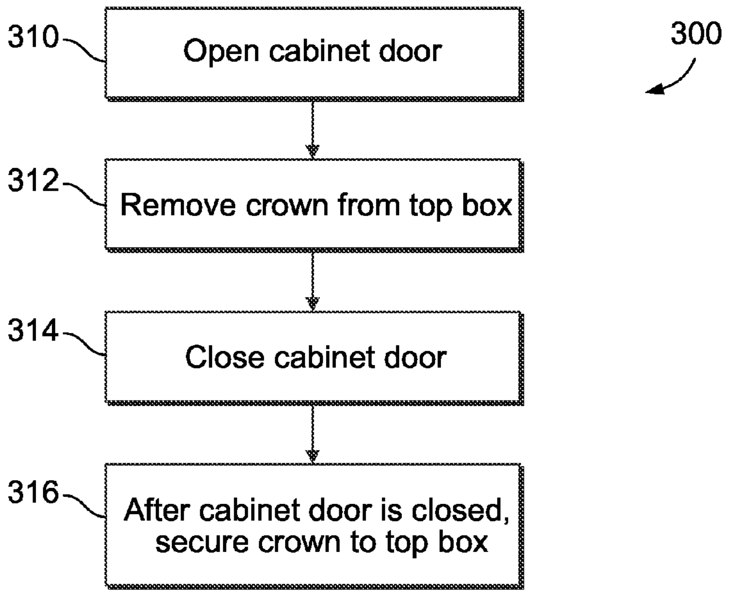
FIG. 10 is a flowchart for a method of performing maintenance on a gaming terminal according to an embodiment of the present invention.

Turning now to FIG. 10, a flowchart for a method of performing maintenance on a gaming terminal 300 is shown. At block 310, a cabinet door coupled to a main body of a gaming terminal is opened. The cabinet door has a closed position that prohibits access to an interior space of the main body and an open position that permits access to the interior space of the main body. In response to the opening of the cabinet door, at block 312, a crown is removed from a top block of the gaming terminal. The crown is positioned above the main body of the gaming terminal. To remove the crown from the top block, the crown is released from a latching assembly that interacts with the cabinet door. At block 314, the cabinet door is closed. At block 316, after the cabinet door is closed, the crown is moved on the top box to secure the crown to the top box via the latching assembly.

The embodiments of the present, invention including the embodiments illustrated and described with respect to FIGS. 1-10, provide a gaming terminal and method of performing maintenance that allow for the crown to be secured to the top box while the cabinet door is in the closed position. Accordingly, the embodiments of the present invention provide several advantages. For example, maintenance and repair activities can be performed with greater ease and efficiency, especially in situations in which the maintenance and repair activities are directed to components of the gaming terminal located in the interior space of the top box. A technician is no longer required to open and close the cabinet door multiple times to release and secure the crown to the top box. Additionally, for example, separate release and locking mechanisms located in the main body and the top box, respectively, for releasing and locking the crown and the top box are not required. As a result, the gaming terminals can be manufactured and assembled with less difficulty because there is no need to manually connect the release mechanism in the main body to the locking mechanism in the top box.

Each of these embodiments and obvious variations thereof is contemplated as falling within the spirit and scope of the claimed invention, which is set forth in the following claims.

What is claimed is:

1. A gaming terminal, comprising:

a main body having a cabinet door, the cabinet door having a closed position and an open position;

a top box positioned above the main body and including a crown, the crown being moveable from a first position prohibiting access to the top box to a second position providing access to the top box;

a latching assembly for securing and releasing the crown, the latching assembly being configured to release the crown in response to the cabinet door being moved from the closed position to the open position so as to permit movement of the crown from the first position to the second position, the latching assembly being further configured to secure the crown in response to the crown being moved from the second position to the first position when the cabinet door is in the closed position, wherein the latching assembly includes a latch having a closed latch position for securing the crown and an open latch position for releasing the crown, the latch being biased towards the closed latch position, the latch engaging a feature of the crown when the latch is in the closed latch position, the latch being configured to be moved from the closed latch position to the open latch position in response to the cabinet door being moved from the closed position to the open position, the latch assembly further including a hinge base coupled to a frame of the gaming terminal and a hinge arm coupled to the cabinet door, the latch and the hinge arm being pivotally coupled to the hinge base, the hinge arm including a driving member and the latch including a hook, the driving member engaging the hook when the cabinet door is moved from the closed position to the open position so as to thereby move the latch from the closed latch position to the open latch position.

2. The gaming terminal of claim 1, wherein the feature of the crown includes a catch and the latch includes a second hook that engages the catch when the crown is in the first position and the cabinet door is in the closed position.

3. The gaming terminal of claim 1, wherein the latch is biased towards the closed latch position by a spring.

4. The gaming terminal of claim 1, wherein the latch is configured to be moved from the closed latch position to the open latch position in response to the crown being moved from the second position to the first position.

5. The gaming terminal of claim 1, wherein the latch and the hinge arm are pivotally coupled to the hinge base by a hinge pin.

6. The gaming terminal of claim 1, further comprising a second latching assembly for securing and releasing the crown, the latching assembly and the second latching assembly being configured to secure the crown in response to the crown being moved from the second position to the first position when the cabinet door is in the closed position.

7. The gaming terminal of claim 6, wherein the latching assembly and the second latch assembly each have an open latch position for releasing the crown and a closed latch position for securing the crown, the second latching assembly not directly interacting with the cabinet door, and the gaming terminal further comprises a hook link coupled to the latching assembly and the second latching assembly such that the second latching assembly is moved between the closed latch position and the open latch position in response to the latching assembly being moved between the closed latch position and the open latch position.

8. The gaming terminal of claim 1, further comprising a second latching assembly for securing and releasing the crown and a second cabinet door coupled to the main body, the latching assembly being coupled to the cabinet door and the second latching assembly being coupled to the second cabinet door, the second door having a second closed position and a second open position, the latching assembly and the second latching assembly being configured to secure the crown in response to the crown being moved from the second position to the first position when the cabinet door is in the closed position and the second cabinet door is in the second closed position.

9. The gaming terminal of claim 8, wherein the latching assembly and the second latching assembly each have an open latch position for releasing the crown and a closed latch position for securing the crown, and the gaming terminal further comprises a hook link coupled to the latching assembly and the second latching assembly such that the latching assembly is moved between the closed latch position and the open latch position in response to the second latching assembly being moved between the closed latch position and the open latch position.

10. A method of performing maintenance on a gaming terminal, the gaming terminal including a main body and a top box, the main body including a cabinet door, the top box including a crown, the method comprising:

opening the cabinet door, the cabinet door having a closed position, an open position, and an intermediate position between the closed position and the open position;

in response to opening the cabinet door, releasing the crown from a latching assembly that interacts with the cabinet door and removing the crown from the top box;

closing the cabinet door; and after closing the cabinet door, moving the crown on the top box to secure the crown to the top box via the latching assembly, wherein the opening the cabinet door includes:

moving the cabinet door from the closed position to the intermediate position, the crown being secured to the top box by the latching assembly as the cabinet door is moved from the closed position to the intermediate position; and moving the cabinet door from the intermediate position to the open position, the crown being released by the latching assembly as the cabinet door is moved from the intermediate position to the open position.

11. The method of claim 10, wherein the main body and the cabinet door define a first interior space of the gaming terminal and wherein the top box and the crown define a second interior space, the second interior space being partitioned from the first interior space.

12. The method of claim 10, wherein the latching assembly includes a latch having a closed latch position for securing the crown and an open latch position for releasing the crown, the latch being biased towards the closed latch position, the latch engaging a feature of the crown when the latch is in the closed latch position, the latch assembly further including a hinge base coupled to a frame of the gaming terminal and a hinge arm coupled to the cabinet door, the latch and the hinge arm being pivotally coupled to the hinge base, the hinge arm including a driving member and the latch including a hook, the method further comprising:

moving the latch from the closed latch position to the open latch position in response to the cabinet door moving from the closed position to the open position, the driving member engaging the hook when the cabinet door is moved from the closed position to the open position so as to thereby move the latch from the closed latch position to the open latch position.

13. The method of claim 10, wherein the moving the crown on the top box to secure the crown includes moving the latch from the closed latch position to the open latch position with the cabinet door in the closed position.

14. A gaming terminal, comprising:

a main body having a cabinet door, the cabinet door having a closed position and an open position;

a top box positioned above the main body and including a crown, the crown being moveable from a first position prohibiting access to the top box to a second position providing access to the top box;

a latching assembly for securing and releasing the crown, the latching assembly including:

a hinge arm coupled to the cabinet door, a driving member extending from the hinge arm, and a latch configured to engage the driving member, the latch having a closed latch position for engaging a feature of the crown to secure the crown to the top box and an open latch position for disengaging from the feature of the crown to release the crown from the top box, wherein the hinge arm is actuated in response to the cabinet door being moved between the closed position and the open position, the driving member is actuated in response to the hinge arm being actuated, and the latch is actuated between the closed latch position and the open latch position in response to the driving member being actuated, and wherein the latch is actuated in a direction from the closed latch position towards the open latch position in response to the crown being moved from the second position to the first position.

15. The gaming terminal of claim 14, wherein the latch and the hinge arm are pivotally coupled to a hinge base that is coupled to a frame the gaming terminal.

16. The gaming terminal of claim 14, wherein the driving member is integral with the hinge arm.

17. The gaming terminal of claim 14, wherein the hinge arm is positioned in the main body and the latch is position in the top box.

18. The gaming terminal of claim 17, wherein the driving member extends from the main body to the top box.

19. The gaming terminal of claim 14, wherein the top box is integrally formed with the main body.

20. The gaming terminal of claim 14, wherein the top box is mounted to the main body.

21. The gaming terminal of claim 14, wherein the cabinet door is pivotally coupled to the main body by a pivot mechanism having a horizontal axis of rotation.

22. The gaming terminal of claim 14, wherein the latching assembly further includes a first stop that limits the movement of the latch in a direction from the closed latch position to the open latch position.

23. The gaming terminal of claim 22, wherein the latching assembly further includes a second stop that limits the movement of the latch in a direction from the open latch position to the closed latch position.

24. The gaming terminal of claim 14, wherein the latching assembly is configured to provide a dwell such that the latch is not actuated in response to specific movements of the cabinet door between the closed position and the open position.

25. A gaming terminal, comprising:

a main body having a cabinet door, the cabinet door having a closed position and an open position;

a top box positioned above the main body and including a crown, the crown being moveable from a first position prohibiting access to the top box to a second position providing access to the top box;

a latching assembly for securing and releasing the crown, the latching assembly being configured to release the crown in response to the cabinet door being moved from the closed position to the open position so as to permit movement of the crown from the first position to the second position, the latching assembly being further configured to secure the crown in response to the crown being moved from the second position to the first position when the cabinet door is in the closed position, the latching assembly including a latch having a closed latch position for securing the crown and an open latch position for releasing the crown, the latch being biased towards the closed latch position, the latch engaging a feature of the crown when the latch is in the closed latch position, the latch being configured to be moved from the closed latch position to the open latch position in response to the cabinet door being moved from the closed position to the open position, wherein the latch assembly further includes:

a hinge arm coupled to the cabinet door, the hinge arm further being pivotally coupled to a cabinet frame of the gaming terminal at a first pivot point; and a driving member coupled to the hinge arm at a first end and the latch at a second end, the latch being coupled to the cabinet frame at a second pivot point, the hinge arm rotating about the first pivot point so that the driving member causes the latch to rotate about the second pivot point from the closed latch position to the open latch position in response to the cabinet door being moved from the closed position to the open position.

26. The gaming terminal of claim 25, wherein the latch further includes a slot and the driving member includes a pin member received in the slot to facilitate the movement of the latch about the second pivot point.

27. The gaming terminal of claim 25, further comprising a second latching assembly for securing and releasing the crown, the latching assembly and the second latching assembly being configured to secure the crown in response to the crown being moved from the second position to the first position when the cabinet door is in the closed position.

28. The gaming terminal of claim 27, wherein the latching assembly and the second latch assembly each have an open latch position for releasing the crown and a closed latch position for securing the crown, the second latching assembly not directly interacting with the cabinet door, and the gaming terminal further comprises a hook link coupled to the latching assembly and the second latching assembly such that the second latching assembly is moved between the closed latch position and the open latch position in response to the latching assembly being moved between the closed latch position and the open latch position.

29. The gaming terminal of claim 25, further comprising a second latching assembly for securing and releasing the crown and a second cabinet door coupled to the main body, the latching assembly being coupled to the cabinet door and the second latching assembly being coupled to the second cabinet door, the second door having a second closed position and a second open position, the latching assembly and the second latching assembly being configured to secure the crown in response to the crown being moved from the second position to the first position when the cabinet door is in the closed position and the second cabinet door is in the second closed position.

30. The gaming terminal of claim 29, wherein the latching assembly and the second latching assembly each have an open latch position for releasing the crown and a closed latch position for securing the crown, and the gaming terminal further comprises a hook link coupled to the latching assembly and the second latching assembly such that the latching assembly is moved between the closed latch position and the open latch position in response to the second latching assembly being moved between the closed latch position and the open latch position.

* * * * *